United States Patent [19]

Muller et al.

[11] 4,007,390
[45] Feb. 8, 1977

[54] BRUSHLESS D-C MOTOR

[75] Inventors: Rolf Muller; Georg Friedrich Papst; Volker Schlicker, all of St. Georgen, Germany

[73] Assignee: Papst-Motoren KG, Germany

[22] Filed: July 26, 1974

[21] Appl. No.: 492,146

[30] Foreign Application Priority Data

July 26, 1973 Luxembourg .................. 68101

[52] U.S. Cl. .......................... 310/90; 310/156; 310/268
[51] Int. Cl.$^2$ .................................. H02K 5/16
[58] Field of Search ............ 310/44, 90, 156, 268, 310/68 A–68 D; 318/138, 254

[56] References Cited

UNITED STATES PATENTS

| 3,002,118 | 9/1961 | Papst | 310/67 X |
|---|---|---|---|
| 3,324,321 | 6/1967 | Kober | 310/268 X |
| 3,482,131 | 12/1969 | Lytle | 310/268 |
| 3,513,339 | 5/1970 | Harris et al. | 310/90 |
| 3,604,962 | 9/1971 | Larson et al. | 310/90 X |
| 3,786,290 | 1/1974 | Papst et al. | 310/90 |
| 3,845,339 | 10/1974 | Merkle et al. | 310/268 X |

Primary Examiner—Donovan F. Duggan
Attorney, Agent, or Firm—Craig & Antonelli

[57] ABSTRACT

In the case of a collector-less D-C motor designed as a disc motor with an external rotor, the permanently magnetized external rotor is supported in an axially space-saving manner in a bearing tube attached to the stator bedplate. For the purpose of facilitating centering of the stator bedplate in the air gap of the rotor during manufacture, a flange plate inserted onto the bearing tube serves for anchoring purposes, and the stator bedplate is secured to this flange plate.

13 Claims, 6 Drawing Figures

BRUSHLESS D-C MOTOR

BACKGROUND AND SUMMARY OF THE INVENTION

The invention relates to a collector-less D-C motor with a flat stator body, flat motor coils being provided in the stator body which is inserted onto a bearing tube in which the rotor shaft is pivotably arranged (generally in two radial bearings situated at the ends of the bearing tube). Firmly attached to each of the free ends of the rotor shaft projecting out of the bearing tube is a rotor disc, at least one of which has an axially permanently magnetized magnet, and these rotor parts located at both sides of a bedplate leave an air gap into which the motor coils project.

In the case of such D-C motors designed as a disc motor with external rotor, the exciting field is commutated by an electronic commutator-type switching. This electronic commutator-type switching is triggered as a function of each rotor position by an element which is sensitive to a magnetic field, for instance a Hall element. Details of the ways and means and of the mode of action of the commutator-type switching and of the electromotive arrangement are described in the U.S.A. application of Rolf Muller, Ser. No. 363,291, assigned to Papst-Motoren KG, St. Georgen.

In connection moreover with motors of the type under consideration here, an attempt is made to obtain as narrow an air gap as possible, and then the stator bedplate must be very stiff and very accurately adjusted relative to the rotor so that it is centered within the narrow air gap and supports the motor without grazing.

One known disc-type D-C motor with external rotor has a coil supporting body of the bedplate type provided with a contoured bush into which the bearing tube is pressed. This bush requires much space, and in mass production it is also awkward to adjust it axially. The coil supporting body of the known motor is a complicated die-cast part with weak points and is not very stiff relative to deflecting forces.

The most important objects of this present invention are to improve a collector-less D-C motor of the kind indicated in the foregoing to the extent:

that during mass production the flat and reliably secured stator body can be adjusted easily and accurately relative to the first rotor disc, and being sufficiently rigid, and the whole structure without need of additional axial length; that relative to the first rotor disc and relative to the stator bedplate, the second rotor disc and consequently the width of the air gap can be adjusted easily and accurately during mass production; that the axial magnetic forces which draw the rotor discs towards each other are supported in a simple manner and as far as possible without loss of power; and that at power take-off of the torque the power take-off forces directed at canting the rotor shaft in the bearings can be avoided.

These objects are achieved in the following manner: A stator bedplate known per se is secured to the bearing tube by means of a flange plate which is fastened to the bearing tube, to which the stator bedplate inserted over the bearing tube is secured while lying against it at one side. The hub of the first rotor disc has a butting face for the front end of the bearing tube facing in that direction. The hub of the first rotor disc is preferably attached so as to have a fixed seat on the rotor shaft, and the hub of the second rotor disc is slipped onto the shaft with axial play and in the direction of the first rotor disc it lies against a stop disc. The hub of the first rotor disc is preferably designed as a drive wheel with a blind hole, the floor of which is a butting face for a bearing, it being practicable that the blind hole extends above the axial center of the power take-off wheel.

DETAILED DESCRIPTION OF THE DRAWINGS

Figure 1:
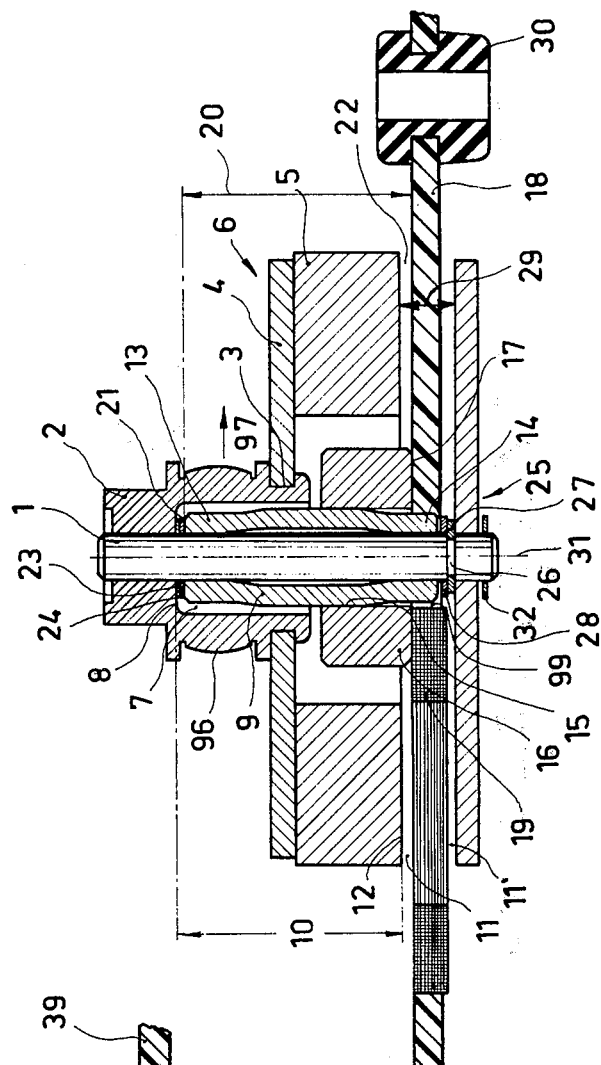
FIG. 1 is a sectional drawing of a D-C motor according to the invention, cut in the left half through the center of one motor coil and cut in the right half through the clearance between the two motor coils.

In accordance with FIG. 1, the rotor shaft is marked as 1 on which is located a press-fitting hub 2 designed as a belt pulley of die-cast metal and which is injected into a central recess 3 of a magnetic return disc 4. Attached to the magnetic return disc 4 coaxially with the axis 31 is a circular magnet 5 which is permanently magnetized in an axial direction. The magnetic return disc 4 and the magnet 5 form with the hub 2 the first disclike formed rotor part, or rotor disc 6 which is assembled as a structural unit. The hub 2 has a blind hole 7, the front end of which serves indirectly as butting face 8 for the bearing tube 9 slipped in such a manner onto the shaft 1 that the seat has axial play. Axially considered, this construction is very compact. That axial spacing which is between this butting face 8 and the surface 12 of the first rotor disc 6 facing the air gap 11, which is marked by a double arrow 10, is dimensioned without much tolerance. Since the hub, being a die-cast part of zinc, including the magnetic return disc 4 and the oxide ceramic magnet 5, are shaped parts of tools, this can be realized economically in series production. The bearing tube 9 consists of dry powdered metal and is drawn in at both ends to form sleeve bearings 13, 14. Located by means of a force fit on the outside middle section 15 of the bearing tube 9 is a flange plate 16, and to its front face 17 which is directed away from (on the opposite side of) the rotor disc 6 the stator bedplate 18 is attached by adhesion so that it is stiffly or rigidly designed. Leading into the stator bedplate 18, which is punched out of a solid plastic plate (Pertinax) and is provided with a printed circuit, are two motor coils lying diametrically opposite to one another, of which only one motor coil 19 is visible in FIG. 1 due to the break in the sectional plane. That axial spacing which is indicated by the double arrow 20 between the front face 21 of the bearing tube 9 running indirectly against the butting face 8 and the front face 17 is dimensioned without much tolerance (in an economic manner during series production by pressing the flange plate 16 onto the bearing tube 9 with a tool provided with a stop), so that the gap 22 consisting of the space between the face 12 and the stator bedplate 18 can be dimensioned so as to be narrow, because this gap results from the difference of the two intervals indicated by the double arrows 10 and 20 minus the thickness of the two steel discs 23, 24 placed between the butting face 8 and the front face 21. Since the mentioned gaps can also be very easily and exactly adhered to even during mass production, it is a simple matter to dimension the gap 22 narrow, which is favorable for the power yield, while a massproduced article which will not graze is still ensured.

The second disclike rotor part (or rotor disc) 25 consists of a magnetic return disc slipped onto the shaft 1 so as to have a seat with play and, due to the axial force exercised by the magnet 5, running bears against a locking wheel 27 provided in a recess 26 of the rotor shaft 1. The axial distance between this recess 26 and the butting face 8 determines, together with the distances according to the double arrows 10 and 20 and the thickness of the steel discs 23 and 24, not only the width of the air gap according to the double arrow 29 but also the upper distance 11 between rotor and stator; with the result that this latter gap 11 can be economically maintained to accurately during mass production, so that there is a diminishing effect on the overall air gap 29 of the mass produced article, since the coil 19 can be economically manufactured at a constant thickness, so that the lower distance 11' and the air gap 29 can be made to close tolerances and of narrow dimensions, such as is desirable for the best possible power yield. The front faces of the bearing tube 9 are relieved from the axial pull exercised by the magnet 5, by the locking disc 27, otherwise it would be on the upper (8) and lower butting faces.

The bearing tube 9 has little tolerance of axial play between the butting face 8, that is to say the steel discs 23, 24 and the locking disc 27, and under certain circumstances the tube 9 can bear against the locking disc 27 by inserting a steel disc 28, although this is not the case in the illustrated operational position because of the slight, but nevertheless present, play of tolerance. A locking ring 32 guards the rotor disc 25 against slipping from the rotor shaft. Through the blind hole 7, one sleeve bearing 13 of the bearing tube 9 projects into the hub 2, and this to such an extent that the transverse force 97 acting on the contact surface 96 of the power take-off pulley is approximately in the center of the sleeve bearing 13, with the result that this transverse force 97, for example from a belt power take-off, does not act on the lower bearing 14. The force 97 would otherwise act as a lever by way of the shaft 1 and press down on the bearing 14, leading to a minute canting of the shaft 1 which however in the case of sleeve bearings, is most disadvantageous on the bearings 13 and 14 where at each axially outer end of the contact surface of the bearings 13, 14 running grooves are formed in the shaft, and this effect reduces the starting torque of sintered sleeve bearings in particular. As a result of the blind hole 7, the axial structural height of the motor is also reduced.

For reasons of stability, the flange plate 16 is designed with greater axial thickness. This produces a relatively large press-fitting or adhesion surface for more reliable anchoring onto the bearing tube 9, even though this tube is narrowed in the region of the bearing 14. But this fact necessitates no additional axial structural height because this thick flange plate 16 projects into the free inner space of the circular magnet 5.

The motor is suspended in rubber sockets arranged around the periphery of the stator bedplate 18 in such a manner that there is insulation against mechanical vibration. Of these rubber sockets, only socket 30 is visible in the sectional view represented in FIG. 1.

The stator bedplate 18 is weakened in the region between the motor coils 19 and the bearing tube 9, and according to FIG. 1, it is even interrupted, since the coil 19 approaches the bearing tube up to a gap 99. In a case, the flange plate 16, in conjunction with such anchoring by adhesion, stabilizes the stator bedplate 18 in this area in a particularly desirable and advantageous manner.

Instead of attaching the flange plate 16 to the bearing tube 9 only by means of a press fit, it may also be attached by means of adhesion.

Figure 2:
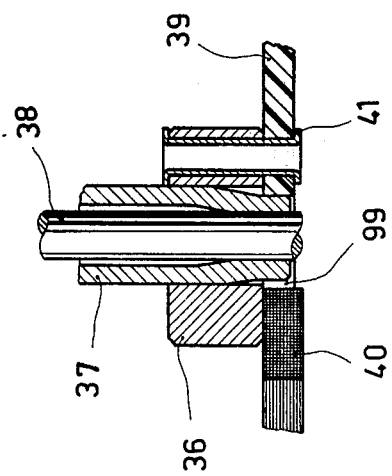
FIG. 2 shows the flange plate, and attached thereto are the parts of a second form of embodiment which is changed relative to FIG. 1 but which shows the same sectional representation as in FIG. 1.

Especially when more than two coils are located in the stator bedplate radially outwardly, these additional coils may also be attached by riveting to the flange plate instead of by adhesion, and this is illustrated in FIG. 2 (but not for this case, however). In FIG. 2, the flange plate has the reference number 36, the bearing tube 37, the rotor shaft 38, the stator bedplate 39 and a motor coil 40. The stator bedplate is riveted to the flange plate 36 by means of two hollow rivets located diametrically opposite one another. The two hollow rivets are arranged in the space between the two motor coils which are likewise mutually offset by 180°; and only one hollow rivet 41 is visible on account of the angular break in the sectional view. Otherwise the form of embodiment illustrated in FIG. 2 is arranged similarly as that in FIG. 1 and offers the same advantages as clarified in the text describing FIG. 1, particularly with respect to adjusting the air gap between the two rotor discs and the arrangement of the stator bedplate within this air gap.

Figure 3:
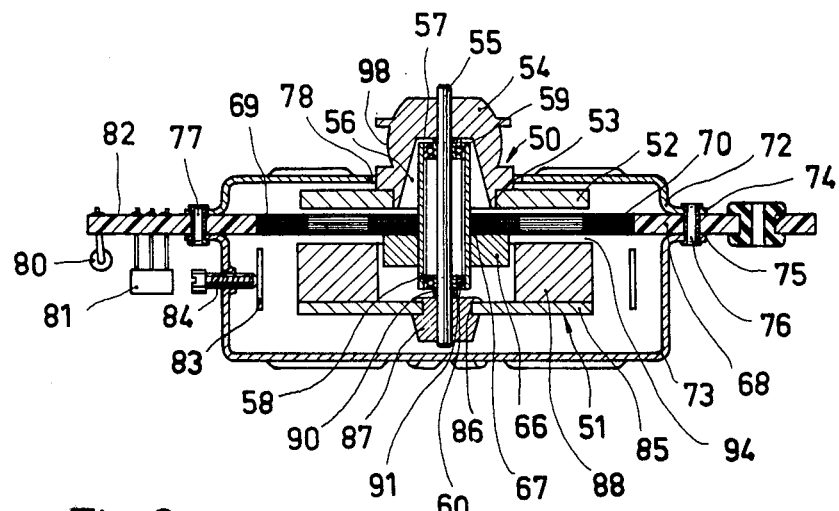
FIG. 3 is a third form of embodiment of a D-C motor according to the invention, sectional view.
Figure 4:
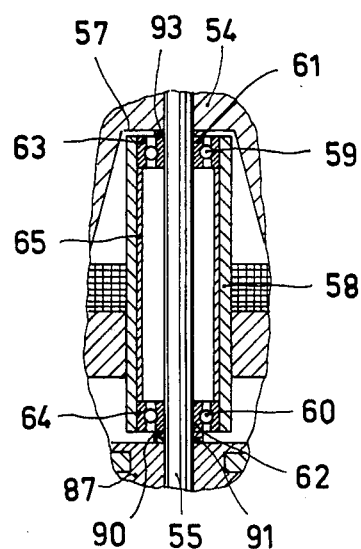
FIG. 4 is a detail with the bearing tube of FIG. 3 in the same sectional view as in FIG. 3 but on a larger scale and with further details.

In the second form of embodiment illustrated in FIG. 3, the first rotor disc has the reference number 50 and the second rotor disc has the reference number 51. These two rotor discs each form a structural unit. The rotor disc 50 consists of the magnetic return disc 52 which has a central recess 53 into which is placed the brass hub 54 which hub is designed as a belt off-drive pulley manufactured on an automatic screw machine and which hub is mounted on the rotor shaft 55 with a press fit. The hub 54 has a blind hole 56, the front face of which has a butting face 57 for the bearing tube 58 slipped onto the rotor shaft 55 so as to have axial play. The bearing tube is provided at both ends with two ball bearings 59, 60 in which the rotor shaft 55 rotates. The inner faces 61, 62 of the ball bearings 59, 60 are located with axial play on the rotor shaft 55, such as illustrated in FIG. 4 and the outer races 63, 64 are inserted on both sides of an internal tube 65 within the bearing tube 58. The flange plate 66 is slipped onto the bearing tube 58 and secured e.g. by adhesion. The stiff stator bedplate 68 is attached to that front face 67 of the flange plate 66 which is facing the rotor disc 50. Two motor coils 69, 70 have been provided in the stator bedplate 68 diametrically opposite to one another. The stator bedplate 68 is riveted between the outer edges 74, 75 of two casing shells 72, 73 made of sheet iron. Two of the rivets 76, 77 arranged around the periphery are visible in FIG. 3. The two casing shells 72 and 73 form a metal casing for the rotor which consists of the two rotor discs 50 and 51, and the hub 54 of said rotor projects through a central opening 78 out of the casing. Electronic switching elements for electronic commutator switching may be attached to the stator bedplate 68, such as the illustrated switching elements 80, 81 on the edge 82 of the stator bedplate projecting out of the casing or alternately provided inside the casing, not shown to avoid confusion. A reluctance piece 83 of iron is secured to the casing shell 73 by means of attachments which are not visible and the reluctance it can be adjusted by means of an adjusting screw 84 which is screwed into the casing shell 73.

The second (lower) rotor disc 51 is a structural unit consisting of the magnetic return disc 85, having a central recess 86 into which the metal hub 87 is injected and to which a circular magnet 88 is attached which magnet 88 is permanently magnetized in an axial direction. The hub 87 rotates on the inner race 62 of the ball bearing 60 by interposition of two steel discs 90, 91, and the hub 54 rotates with its butting face 57 on the inner race 61 of the ball bearing 59 by interposition of a steel disc 93. In this way, the two hubs 54 and 87 support themselves via the inner races 61, 62 the ball bearings 59, 60 and the internal tube 65 or the bearing tube 58. The internal tube 65 is advantageous when the bearing tube is a smooth cylindrical sleeve. Otherwise the ball bearings 59, 60 are placed in grooves of the bearing tube 58. This support is free from play, because the two rotor discs are drawn towards one another by the magnetic force of the magnet 88 up to the stop. Therefore, the axial spacing of the two rotor discs 50, 51 is very exactly given by the axial position of the two ball bearings as well as by the thickness of the discs 90, 91 and 93, and this dimensioning can be very easily maintained to in mass production. The width of the air gap 94 between the two rotor discs 50 and 51 is determined moreover by the axial distance between those areas of the rotor discs 50 and 51 which limit this air gap 94 and by the butting faces of the hubs 54 and 87, and since these distances can also be very easily maintained to exactly in mass production, for instance as described with reference to FIG. 1, the width of the air gap can be maintained to within close tolerances. The adjustment of the stator bedplate 68 within the air gap is also easy, because this adjustment can be determined by the axial position of the flange plate 66 on the bearing tube 58. The gap, for example 94, between rotor disc 51 and stator bedplate 68, can be altered by variation in the thickness of the discs 90, 91. However, the electric motor will be somewhat weaker when it is necessary to enlarge gap 94 for instance for safety against grazing.

The hub 54 is also designed as a power take-off pulley, and its face has the reference number 98. The blind hole 56 extends up to the height of this off-take face 98, as a result of which the transverse loads can be better absorbed, as has already been explained in the description of FIG. 1. But this problem is not so critical in connection with ball bearings.

A casing formed by the casing shells 72 and 73 for the form of embodiment illustrated in FIG. 3 and FIG. 4 can also be provided for the form of embodiment illustrated in FIG. 1.

Figure 5:
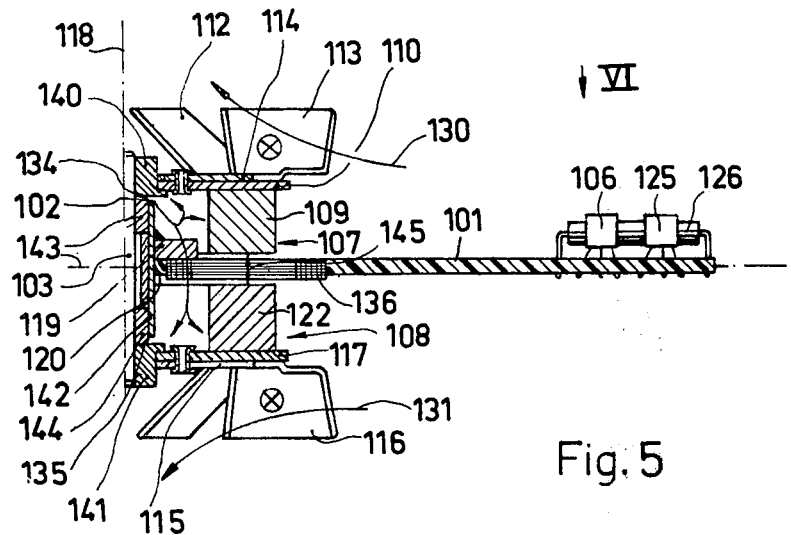
FIG. 5 is a sectional view of the right half of a fourth form of embodiment.
Figure 6:
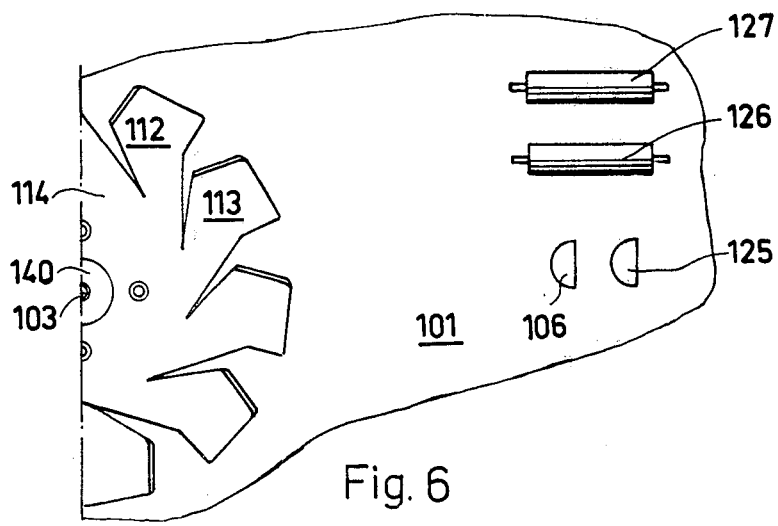
FIG. 6 is a partial view according to the arrow VI of FIG. 5.

According to FIGS. 5 and 6, a switching bedplate 101 of electrically insulating plastic material is about 5 millimeters thick and stiff, and is fitted with switching elements 106, 125, 126, 127 which in part also belong to the electronic commutator switching of the D-C motor.

The D-C motor is part of a built-in fan. The rotor 102 consists of two rotor discs 107, 108, each of which forms a structural unit. The rotor disc 107 comprises a permanently magnetized ring magnet 109 which is attached to a magnetic return disc 110 of iron, and to the other side of the magnetic return disc 110 is attached a punched out part of sheet metal 114 with fan blades 112, 113. The rotor disc 108 on the opposite side is designed in mirror symmetry thereto and comprises the ring magnet 122 which is attached to the magnetic return disc 117 on which there is also secured a punched out part 115 with fan blades 116. Each of the two rotor discs 107, 108 has a metal hub 140, 141 with which the discs are mounted for rotation onto the rotor shaft 103. The rotor shaft 103 is rotatably arranged with two sleeve bearings 143, 144 located at the ends of a bearing tube 142. The two rotor discs 107, 108 which are drawn towards one another by the magnets 109, 122 rotate with the butting faces 134, 135 of their hubs 140, 141 on the two end faces of the bearing tube 142. By virtue of the axial dimensions of the rotor discs 107, 108, the width 145 of the air gap can be maintained within close tolerances. A flange plate 119 is attached to the bearing tube, for example by welding. The bearing tube 142 is inserted into an opening 120 of the switching bedplate 101 and is secured therein by adhering the flange plate 119 to the switching bedplate 101. In mass production, as already described, the flange plate 119 can easily be axially positioned very accurately on the bearing tube 142, so that the switching bedplate can easily be exactly centered even in an air gap 145 which is narrow. Bearing tube 142 and flange plate 119 can be of integral design as a turned part.

Two flat coils are provided in the stator bedplate 101, by way of which the motor is held, as in the case of the foregoing examples of FIGS. 1 and 3 these coils are located diametrically opposite one another, but only the flat coil with the reference number 136 is visible in the drawing. During operation, the fan blades 112, 113, 116 convey air as indicated by the arrows 130, 131, and this air streams along both sides of the switching bedplate 101, cooling the switching elements mounted there, and then the air is blown off in the direction of the axis 118.

The invention makes it possible to realize economically a simply constructed, operationally safe and compact disc-type rotor motor with rotor discs lying axially outside (compare the motor known as the external rotor type).

We claim:
1. Brushless D-C motor comprising:
rigid flat stator plate,
flat motor coils arranged on said stator plate,
bearing tube, said stator plate being coaxial on said bearing tube,
rotor shaft rotatably supported in said bearing tube by radical bearings at respective ends of said bearing tube,
first and second rotor discs fixed to said rotor shaft at each end of said bearing tube, said first and second rotor discs being spaced to provide an air gap, said stator plate and motor coils extending into said air gap,
at least one hub for rotatably supporting at least one of said first and second rotor discs, said hub including a bearing face for bearing against a first respec- tive end of said bearing tube adjacent said one rotor disc, an axially magnetized permanent magnet fixed to at least one of said first and second rotor discs, and means connected at a predetermined axial position on said bearing tube for fixing said stator plate and motor coils to said bearing tube at said axial position within said air gap, said means having a portion secured to said stator plate, wherein said means for fixing said stator plate and motor coils is a member having axial and radial thicknesses, said member having an aperture for insertion of said member onto said bearing tube, said portion securing said stator plate being a radial surface of said member, wherein said member is connected to said bearing tube by means of a press fit, and wherein said stator plate is secured to said radial surface of said member by means of rivets extending through said stator plate and said member in the axial direction.

2. Brushless C-D motor comprising:

rigid flat stator plate, flat motor coils arranged on said stator plate, bearing tube, said stator being coaxial on said bearing tube, rotor shaft rotatably supported in said bearing tube by radial bearings at respective ends of said bearing tube, first and second rotor discs fixed to said rotor shaft at each end of said bearing tube, said first and second rotor discs being spaced to provide an air gap, said stator plate and motor coils extending into said air gap, at least one hub for rotatably supporting at least one of said first and second rotor discs, said hub including a bearing face for bearing against a first respective end of said bearing tube adjacent said one rotor disc, an axially magnetized permanent magnet fixed to at least one of said first and second rotor discs, and means connected at a predetermined axial position on said bearing tube for fixing said stator plate and motor coils to said bearing tube at said axial position within said air gap, said means having a portion secured to said stator plate, wherein said means for fixing said stator plate and motor coils is a member having axial and radial thicknesses, said member having an aperture for insertion of said member onto said bearing tube, said portion secured to said stator plate being a radial surface of said member secured to said stator plate by means of adhesion, wherein said member is connected to said bearing tube by means of a press fit, wherein said magnet is fixed only to one of said first and second rotor discs, said magnet being circular and coaxially surrounding at least a portion of both said bearing tube and the axial thickness of said member, said radial surface of said member facing axially away from said magnet, and wherein said hub supporting said one rotor disc is secured to said rotor shaft by means of a press-fit such that said one rotor disc is rotatable with said rotor shaft, and wherein said second rotor disc is rotatably mounted on said rotor shaft by means of a locking wheel bearing against a second respective end of said bearing tube adjacent said second rotor disc and by means of a locking ring.

3. D-C motor according to claim 2, wherein said bearing tube is of sintered metal, and wherein said radial bearings are sleeve bearings provided by an internal configuration of said bearing tube at said respective ends.

4. D-C motor according to claim 3, wherein a first steel disc is inserted on said rotor shaft between said bearing face of said hub and said first respective end of said bearing tube, and a second steel disc is inserted on said rotor shaft between said locking wheel and said second respective face of said bearing tube.

5. Brushless D-C motor comprising:

rigid flat stator plate, flat motor coils arranged on said stator plate, bearing tube, said stator plate being coaxial to said bearing tube, rotor shaft rotatably supported in said bearing tube by radial bearings at respective ends of said bearing tube, first and second rotor discs mounted on said rotor shaft at each end of said bearing tube, said first and second rotor discs being spaced to provide an air gap, said stator plate and motor coils extending into said air gap, at least one hub for rotatably supporting at least one of said rotor discs on said rotor shaft, said hub including a bearing face for bearing against a first respective face at one end of said bearing tube adjacent said one rotor disc, said second rotor disc being rotatably mounted on said rotor shaft by means of a locking wheel bearing respectively against a second respective face at the other end of said bearing tube and said second rotor disc, said second rotor disc being locked on the rotor shaft by means of a locking element, at least one axially magnetized permanent magnet fixed to one of said first and second rotor discs, and means connected at a predetermined axial position on said bearing tube for fixing said stator plate and motor coils to said bearing tube at said axial position within said air gap, wherein said means is a separate member having axial and radial thickness and an aperture through said axial thickness for insertion of said member onto said bearing tube, and said member having a radial surface along the radial thickness for securing said stator plate to said member, and wherein said magnet is circular and coaxially surrounds at least a portion of both said bearing tube and the axial thickness of said member, said radial surface of said member facing axially away from said magnet.

6. D-C motor according to claim 5, wherein said bearing tube is of sintered metal, and wherein said radial bearings are sleeve bearings provided by an internal configuration of said bearing tube at said respective ends.

7. D-C motor according to claim 5, wherein a first steel disc is inserted on said rotor shaft between said bearing face of said hub and said first respective end of said bearing tube, and a second steel disc is inserted on said rotor shaft between said locking wheel and said second respective face of said bearing tube.

8. D-C motor according to claim 5, wherein each of said first and second rotor discs is rotatably supported by respective first and second hubs with an axial space of close-tolerance dimensions between the respective one of said first and second rotor disc surface which defines said air gap and said bearing face of the respective one of said first and second hubs, and wherein said bearing tube, said member and said stator plate are assembled into a structural unit such that an adjusted axial spacing is provided between said first respective end of said bearing tube against said bearing face and said stator plate.

9. D-C motor according to claim 5, wherein said at least one hub includes a surface of a take-off wheel for a belt pulley, said hub being inserted over said bearing tube to an axial distance such that said end of said bearing tube axially corresponds to said surface of said take-off wheel.

10. Brushless D-C motor comprising:

rigid flat stator plate, flat motor coils arranged on said stator plate, bearing tube, said stator plate being coaxial to said bearing tube, rotor shaft rotatably supported in said bearing tube by radial bearings at respective ends of said bearing tube, wherein said radial bearings include ball bearings having respective inner and outer races, said outer races being supported axially with said bearing tube, and said inner races being mounted with axial play on said rotor shaft, first and second rotor discs mounted on said rotor shaft at each end of said bearing tube, said first and second rotor discs being spaced to provide an air gap, said stator plate and motor coils extending into said air gap, first and second hubs respectively for rotatably supporting each of said first and second rotor discs, each of said hubs including a bearing face for bearing against respective bearing surfaces at the respective ends of said bearing tube adjacent to said first and second rotor discs, each of said hubs being secured to said rotor shaft by means of a press-fit such that each of said rotor discs is rotatable with said rotor shaft, at least one axially magnetized permanent magnet fixed to one of said first and second rotor discs, wherein said first and second rotor discs are held under axial magnetic attraction toward one another against said inner races of said ball bearings, means connected at a predetermined axial position on said bearing tube for fixing said stator plate and motor coils to said bearing tube at said axial position within said air gap, said means having a portion secured to said stator plate, wherein said means is a separate member having axial and radial thicknesses and an aperture through said axial thickness for insertion of said member onto said bearing tube, and said member having a radial surface along the radial thickness for securing said stator plate to said member, and wherein said magnet is circular and coaxially surrounds at least a portion of both said bearing tube and the axial thickness of said member, said radial surface of said member facing axially away from said magnet.

11. D-C motor according to claim 10, wherein respective first and second steel discs are inserted on said rotor shaft between said bearing faces of said first and second hubs and said bearing surfaces at the respective ends of said bearing tube.

12. D-C motor according to claim 10, wherein each of said first and second rotor discs is rotatably supported by said first and second hubs with an axial space of close-tolerance dimensions between the respective one of said first and second rotor disc surface which defines said air gap and said bearing face of the respective one of said first and second hubs, and wherein said bearing tube, said member and said stator plate are assembled into a structural unit such that an adjusted axial spacing is provided between said first respective end of said bearing tube bearing against said bearing face and said stator plate.

13. D-C motor according to claim 10, wherein at least one hub includes a surface of a take-off wheel for a belt pulley, said hub being inserted over said bearing tube to an axial distance such that the end of said bearing tube axially corresponds to said surface of said take-off wheel.

* * * * *